(12) United States Patent
Hambling et al.

(10) Patent No.: US 11,235,539 B2
(45) Date of Patent: Feb. 1, 2022

(54) FIBER MANAGEMENT ARRANGEMENT AND METHOD FOR ADDITIVE MANUFACTURING SYSTEM

(71) Applicant: Continuous Composites Inc., Coeur d'Alene, ID (US)

(72) Inventors: Colin Hugh Hambling, Medina, WA (US); Trevor David Budge, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 231 days.

(21) Appl. No.: 16/516,119

(22) Filed: Jul. 18, 2019

(65) Prior Publication Data

US 2020/0086587 A1 Mar. 19, 2020

Related U.S. Application Data

(60) Provisional application No. 62/730,541, filed on Sep. 13, 2018.

(51) Int. Cl.
*B29C 64/209* (2017.01)
*B29C 69/00* (2006.01)
(Continued)

(52) U.S. Cl.
CPC ............ *B29C 69/001* (2013.01); *B22F 10/10* (2021.01); *B29C 64/118* (2017.08);
(Continued)

(58) Field of Classification Search
CPC ..... B29C 64/35; B29C 64/209; B29C 64/255; B29C 64/165; B29C 64/321
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 0144927 A2 6/1985
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Joseph S Del Sole
*Assistant Examiner* — Margaret B Hayes
(74) *Attorney, Agent, or Firm* — Ryan C. Stockett (57) ABSTRACT

A method is disclosed for severing a continuous reinforcement from a print head at conclusion of an event during fabrication of a composite structure. The method may include moving the print head a distance away from the composite structure that provides clearance for a cutting mechanism between an outlet of the print head and the composite structure, and responsively causing the cutting mechanism to make a first cut of the continuous reinforcement at a boundary of the composite structure. The method may also include moving the print head to a waste discard location, and responsively causing the cutting mechanism to make a second cut of the continuous reinforcement at a desired distance offset from the outlet of the print head.

19 Claims, 3 Drawing Sheets

(51) Int. Cl.

| | | |
|---|---|---|
| *B29C 64/255* | (2017.01) | |
| *B29C 64/165* | (2017.01) | |
| *B29C 64/321* | (2017.01) | |
| *B29C 64/118* | (2017.01) | |
| *B29C 64/268* | (2017.01) | |
| *B29C 64/314* | (2017.01) | |
| *B33Y 50/02* | (2015.01) | |
| *B29C 64/20* | (2017.01) | |
| *B29C 64/393* | (2017.01) | |
| *B22F 10/10* | (2021.01) | |
| *B33Y 40/00* | (2020.01) | |
| *B33Y 10/00* | (2015.01) | |
| *B33Y 30/00* | (2015.01) | |
| *B33Y 70/00* | (2020.01) | |
| *B29K 105/08* | (2006.01) | |

(52) U.S. Cl.
CPC ............ *B29C 64/165* (2017.08); *B29C 64/20* (2017.08); *B29C 64/209* (2017.08); *B29C 64/255* (2017.08); *B29C 64/268* (2017.08); *B29C 64/314* (2017.08); *B29C 64/321* (2017.08); *B29C 64/393* (2017.08); *B33Y 50/02* (2014.12); *B29K 2105/08* (2013.01); *B33Y 10/00* (2014.12); *B33Y 30/00* (2014.12); *B33Y 40/00* (2014.12); *B33Y 70/00* (2014.12)

(56) References Cited

U.S. PATENT DOCUMENTS

| | | | |
|---|---|---|---|
| 3,984,271 A | | 10/1976 | Gilbu |
| 3,993,726 A | | 11/1976 | Moyer |
| 4,557,783 A | * | 12/1985 | Grone .................. B29C 70/545 156/257 |
| 4,643,940 A | | 2/1987 | Shaw et al. |
| 4,671,761 A | | 6/1987 | Adrian et al. |
| 4,822,548 A | | 4/1989 | Hempel |
| 4,851,065 A | | 7/1989 | Curtz |
| 5,002,712 A | | 3/1991 | Goldmann et al. |
| 5,037,691 A | | 8/1991 | Medney et al. |
| 5,296,335 A | | 3/1994 | Thomas |
| 5,340,433 A | | 8/1994 | Crump |
| 5,746,967 A | | 5/1998 | Hoy et al. |
| 5,866,058 A | | 2/1999 | Batchelder et al. |
| 5,936,861 A | | 8/1999 | Jang et al. |
| 6,153,034 A | * | 11/2000 | Lipsker .................. B29C 64/40 156/73.1 |
| 6,459,069 B1 | | 10/2002 | Rabinovich |
| 6,501,554 B1 | | 12/2002 | Hackney et al. |
| 6,799,081 B1 | | 9/2004 | Hale et al. |
| 6,803,003 B2 | | 10/2004 | Rigali et al. |
| 6,934,600 B2 | | 8/2005 | Jang et al. |
| 7,039,485 B2 | | 5/2006 | Engelbart et al. |
| 7,555,404 B2 | | 6/2009 | Brennan et al. |
| 7,795,349 B2 | | 9/2010 | Bredt et al. |
| 8,221,669 B2 | | 7/2012 | Batchelder et al. |
| 8,962,717 B2 | | 2/2015 | Roth et al. |
| 9,126,365 B1 | | 9/2015 | Mark et al. |
| 9,126,367 B1 | | 9/2015 | Mark et al. |
| 9,149,988 B2 | | 10/2015 | Mark et al. |
| 9,156,205 B2 | | 10/2015 | Mark et al. |
| 9,186,846 B1 | | 11/2015 | Mark et al. |
| 9,186,848 B2 | | 11/2015 | Mark et al. |
| 9,327,452 B2 | | 5/2016 | Mark et al. |
| 9,327,453 B2 | | 5/2016 | Mark et al. |
| 9,370,896 B2 | | 6/2016 | Mark |
| 9,381,702 B2 | | 7/2016 | Hollander |
| 9,457,521 B2 | | 10/2016 | Johnston et al. |
| 9,458,955 B2 | | 10/2016 | Hammer et al. |
| 9,527,248 B2 | | 12/2016 | Hollander |
| 9,539,762 B2 | | 1/2017 | Durand et al. |
| 9,579,851 B2 | | 2/2017 | Mark et al. |
| 9,688,028 B2 | | 6/2017 | Mark et al. |
| 9,694,544 B2 | | 7/2017 | Mark et al. |
| 9,764,378 B2 | | 9/2017 | Peters et al. |
| 9,770,876 B2 | | 9/2017 | Farmer et al. |
| 9,782,926 B2 | | 10/2017 | Witzel et al. |
| 2002/0009935 A1 | | 1/2002 | Hsiao et al. |
| 2002/0062909 A1 | | 5/2002 | Jang et al. |
| 2002/0113331 A1 | | 8/2002 | Zhang et al. |
| 2002/0165304 A1 | | 11/2002 | Mulligan et al. |
| 2003/0044539 A1 | | 3/2003 | Oswald |
| 2003/0056870 A1 | | 3/2003 | Comb et al. |
| 2003/0160970 A1 | | 8/2003 | Basu et al. |
| 2003/0186042 A1 | | 10/2003 | Dunlap et al. |
| 2003/0236588 A1 | | 12/2003 | Jang et al. |
| 2005/0006803 A1 | | 1/2005 | Owens |
| 2005/0061422 A1 | | 3/2005 | Martin |
| 2005/0104257 A1 | | 5/2005 | Gu et al. |
| 2005/0109451 A1 | | 5/2005 | Hauber et al. |
| 2005/0230029 A1 | | 10/2005 | Vaidyanathan et al. |
| 2007/0003650 A1 | | 1/2007 | Schroeder |
| 2007/0228592 A1 | | 10/2007 | Dunn et al. |
| 2008/0176092 A1 | | 7/2008 | Owens |
| 2009/0095410 A1 | | 4/2009 | Oldani |
| 2011/0032301 A1 | | 2/2011 | Fienup et al. |
| 2011/0143108 A1 | | 6/2011 | Fruth et al. |
| 2012/0060468 A1 | | 3/2012 | Dushku et al. |
| 2012/0159785 A1 | | 6/2012 | Pyles et al. |
| 2012/0231225 A1 | | 9/2012 | Mikulak et al. |
| 2012/0247651 A1 | * | 10/2012 | Nieuwenhove ....... B29C 70/384 156/161 |
| 2012/0247655 A1 | | 10/2012 | Erb et al. |
| 2013/0164498 A1 | | 6/2013 | Langone et al. |
| 2013/0209600 A1 | | 8/2013 | Tow |
| 2013/0233471 A1 | | 9/2013 | Kappesser et al. |
| 2013/0292039 A1 | | 11/2013 | Peters et al. |
| 2013/0337256 A1 | | 12/2013 | Farmer et al. |
| 2013/0337265 A1 | | 12/2013 | Farmer |
| 2014/0034214 A1 | | 2/2014 | Boyer et al. |
| 2014/0061974 A1 | | 3/2014 | Tyler |
| 2014/0159284 A1 | | 6/2014 | Leavitt |
| 2014/0232035 A1 | * | 8/2014 | Bheda .................. B29C 64/118 264/148 |
| 2014/0268604 A1 | | 9/2014 | Wicker et al. |
| 2014/0291886 A1 | * | 10/2014 | Mark .................. B29C 69/001 264/163 |
| 2014/0361460 A1 | * | 12/2014 | Mark .................. B29C 70/521 264/248 |
| 2015/0136455 A1 | | 5/2015 | Fleming |
| 2016/0012935 A1 | | 1/2016 | Rothfuss |
| 2016/0031155 A1 | | 2/2016 | Tyler |
| 2016/0046082 A1 | | 2/2016 | Fuerstenberg |
| 2016/0052208 A1 | | 2/2016 | Debora et al. |
| 2016/0082641 A1 | | 3/2016 | Bogucki et al. |
| 2016/0082659 A1 | | 3/2016 | Hickman et al. |
| 2016/0107379 A1 | | 4/2016 | Mark et al. |
| 2016/0114532 A1 | | 4/2016 | kiu |
| 2016/0136885 A1 | | 5/2016 | Nielsen-Cole et al. |
| 2016/0144565 A1 | | 5/2016 | Mark et al. |
| 2016/0144566 A1 | | 5/2016 | Mark et al. |
| 2016/0192741 A1 | | 7/2016 | Mark |
| 2016/0200047 A1 | | 7/2016 | Mark et al. |
| 2016/0243762 A1 | | 8/2016 | Fleming et al. |
| 2016/0263806 A1 | | 9/2016 | Gardiner |
| 2016/0263822 A1 | | 9/2016 | Boyd |
| 2016/0263823 A1 | | 9/2016 | Espiau et al. |
| 2016/0271876 A1 | | 9/2016 | Lower |
| 2016/0297104 A1 | | 10/2016 | Guillemette et al. |
| 2016/0311165 A1 | | 10/2016 | Mark et al. |
| 2016/0325491 A1 | | 11/2016 | Sweeney et al. |
| 2016/0332369 A1 | | 11/2016 | Shah et al. |
| 2016/0339633 A1 | | 11/2016 | Stolyarov et al. |
| 2016/0346998 A1 | | 12/2016 | Mark et al. |
| 2016/0361869 A1 | | 12/2016 | Mark et al. |
| 2016/0368213 A1 | | 12/2016 | Mark |
| 2016/0368255 A1 | | 12/2016 | Witte et al. |
| 2017/0007359 A1 | | 1/2017 | Kopelman et al. |
| 2017/0007360 A1 | | 1/2017 | Kopelman et al. |
| 2017/0007361 A1 | | 1/2017 | Boronkay et al. |
| 2017/0007362 A1 | | 1/2017 | Chen et al. |
| 2017/0007363 A1 | | 1/2017 | Boronkay |

(56) References Cited

U.S. PATENT DOCUMENTS

| | | |
|---|---|---|
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1* | 6/2017 | Nardiello ............... B29C 48/2883 |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0111339 A1* | 4/2018 | Dodworth ............... C03B 37/16 |
| 2018/0207868 A1* | 7/2018 | Tyler ................... B23K 26/342 |
| 2019/0118258 A1* | 4/2019 | Sachs ................... B29C 64/393 |

FOREIGN PATENT DOCUMENTS

| | | |
|---|---|---|
| EP | 2433784 A1 | 3/2012 |
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/inylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, issue 6, pp. 3799-3805 (May 15, 2012).

International Search Report dated Oct. 24, 2019 for PCT/US2019/043735 to Continuous Composites Inc. Filed Jul. 26, 2019.

\* cited by examiner

FIBER MANAGEMENT ARRANGEMENT AND METHOD FOR ADDITIVE MANUFACTURING SYSTEM

RELATED APPLICATIONS

This application is based on and claims the benefit of priority from U.S. Provisional Application No. 62/730,541 that was filed on Sep. 13, 2018, the contents of which are expressly incorporated herein by reference.

TECHNICAL FIELD

The present disclosure relates generally to additive manufacturing and, more particularly, to a fiber management arrangement and method for an additive manufacturing system.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a heat sink, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D® provides for increased strength and free-space fabrication, the continuous fiber discharging from the print head may need to be severed at the end of each fabrication pass. An exemplary mechanism for severing the fiber is disclosed in U.S. patent application Ser. No. 16/382,054 that was filed on Apr. 11, 2019 (the '054 application), which is incorporated herein by reference. The disclosed fiber management arrangement and method are directed to facilitating and controlling severing of fibers via the mechanism of the '054 application and other fiber cutting mechanisms.

SUMMARY

In one aspect, the present disclosure is directed to a method for severing a continuous reinforcement from a print head at conclusion of an event during fabrication of a composite structure. The method may include moving the print head a distance away from the composite structure that provides clearance for a cutting mechanism between an outlet of the print head and the composite structure, and responsively causing the cutting mechanism to make a first cut of the continuous reinforcement at a boundary of the composite structure. The method may also include moving the print head to a waste discard location, and responsively causing the cutting mechanism to make a second cut of the continuous reinforcement at a desired distance offset from the outlet of the print head.

In another aspect, the present disclosure is directed to print head. The print head may include a reservoir, and an outlet in communication with the reservoir and configured to discharge a continuous reinforcement at least partially coated in a matrix. The print head may also include a fiber management arrangement disposed in the reservoir and configured to selectively draw the continuous reinforcement back through the outlet after cutting of the continuous reinforcement at a location outside of the print head.

In yet another aspect, the present disclosure is directed to an additive manufacturing system configured to fabricate a composite structure. The additive manufacturing system may include a print head configured to discharge a continuous reinforcement at least partially coated with a matrix. The composite structure may be fabricated from the continuous reinforcement and the matrix. The additive manufacturing system may also include a cure enhancer configured expose the matrix to a cure energy during discharge, a support configured to move the print head during discharge, and a cutting mechanism configured to selectively cut the continuous reinforcement. The additive manufacturing system may further include a fiber management arrangement configured to selectively retract back into the print head a tail of the continuous reinforcement after cutting, and a controller configured to coordinate operations of the print head, the support, the cutting mechanism, and the fiber management arrangement.

DETAILED DESCRIPTION

Figure 1:
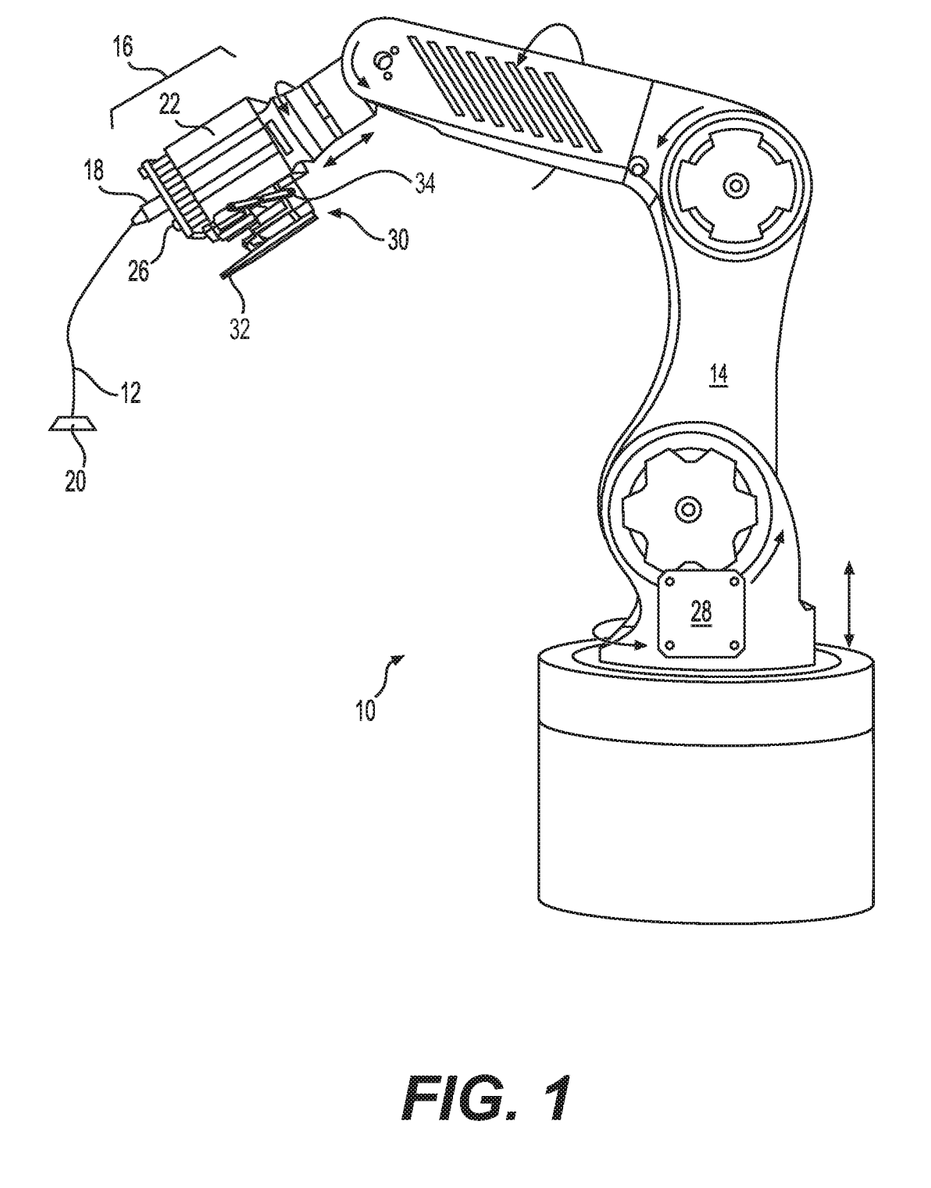
FIG. 1 is an isometric illustration of an exemplary disclosed additive manufacturing system.

FIG. 1 illustrates an exemplary system 10, which may be used to continuously manufacture a composite structure 12 having any desired cross-sectional shape (e.g., ellipsoidal, polygonal, etc.). System 10 may include at least a moveable support 14 and a print head ("head") 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry, a hybrid gantry/arm, or another type of movement mechanism also capable of moving head 16 in multiple directions during fabrication of structure 12. Although support 14 is shown as being capable of multi-axis (e.g., six or more axes) movement, it is contemplated that any other type of support 14 capable of moving head 16 in the same or in a different manner could also be utilized, if desired. In some embodiments, a drive may mechanically couple head 16 to support 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In still other embodiments, the matrix may be pulled into head 16, along with a continuous reinforcement. In some instances, the matrix inside head 16 may need to be kept cool and/or dark to inhibit premature curing; while in other instances, the matrix may need to be kept warm for similar reasons. In either situation, head 16 may be specially configured (e.g., insulated, temperature controlled, shielded, etc.) to provide for these needs.

The matrix may be used to coat, encase, or otherwise at least partially surround (e.g., wet) any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from one or more external spools—not shown). When multiple reinforcements are simultaneously used, the reinforcements may be of the same type and have the same diameters and cross-sectional shapes (e.g., circular, square, flat, hollow, solid, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from a nozzle or other outlet 18 of head 16 via at least two different modes of operation. In a first mode of operation, the matrix and reinforcement are extruded (e.g., pushed under pressure and/or mechanical force) from outlet 18, as head 16 is moved by support 14 to create the 3-dimensional shape of structure 12. In a second mode of operation, at least the reinforcement is pulled from outlet 18, such that a tensile stress is created in the reinforcement during discharge. In this mode of operation, the matrix may cling to the reinforcement and thereby also be pulled from outlet 18 along with the reinforcement, and/or the matrix may be discharged from outlet 18 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, equally distributing loads, etc.), while also allowing for a greater length of unsupported structure 12 to have a straighter trajectory (e.g., by creating moments that oppose gravity).

The reinforcement may be pulled from outlet 18 as a result of head 16 moving away from an anchor point 20. In particular, at the start of structure-formation, a length of matrix-impregnated reinforcement may be pulled and/or pushed from outlet 18, deposited onto a stationary anchor point 20, and cured, such that the discharged material adheres to anchor point 20. Thereafter, head 16 may be moved away from anchor point 20, and the relative movement may cause additional reinforcement to be pulled from outlet 18. It should be noted that the movement of the reinforcement through head 16 could be assisted (e.g., via internal feed mechanisms), if desired. However, the discharge rate of the reinforcement from outlet 18 may primarily be the result of relative movement between head 16 and anchor point 20, such that tension is created within the reinforcement.

Outlet 18 may be fluidly connected to a matrix reservoir 22. Although matrix reservoir 22 is shown as being at least partially inside of head 16, it should be noted that matrix reservoir 22 and/or another wetting mechanism could alternatively be located separately from (e.g., upstream of) head 16. In the disclosed embodiment, outlet 18 is a generally cylindrical component having an upstream or base end in communication with matrix reservoir 22, a downstream or discharge tip, and one or more passages that extend from the base end to the tip end. It is contemplated that, in some embodiments, head 16 may be nozzle-less, if desired.

Any number of reinforcements (represented as R in FIGS. 2-8) may be passed axially through reservoir 22 (or another wetting mechanism—not shown), where at least some matrix-wetting occurs (matrix represented as M in FIGS. 2-8), and discharged from head 16 via outlet 18. One or more orifices may be located at the tip end of outlet 18 to accommodate passage of the matrix-wetted reinforcements. In the disclosed embodiment, a single generally circular orifice is utilized. It is contemplated, however, that multiple circular orifices could be used. In addition, orifices of another shape (e.g., a rectangular shape) may allow for printing of ribbons and/or sheets that do not have a circular shape.

One or more cure enhancers (e.g., one or more light sources, ultrasonic emitters, lasers, heaters, catalyst dispensers, microwave generators, etc.) 26 may be mounted proximate head 16 (e.g., around outlet 18 or only at a trailing side of outlet 18) and configured to enhance a cure rate and/or quality of the matrix as it is discharged from outlet 18. Cure enhancer 26 may be controlled to selectively expose internal and/or external surfaces of structure 12 to cure energy (e.g., light energy, electromagnetic radiation, vibrations, heat, a chemical catalyst or hardener, etc.) during the formation of structure 12. The cure energy may increase a rate of chemical reaction occurring within the matrix, sinter the material, harden the material, or otherwise cause the material to cure as it discharges from outlet 18.

A controller 28 may be provided and communicatively coupled with support 14, head 16, and any number and type of cure enhancers 26. Controller 28 may embody a single processor or multiple processors that include a means for controlling an operation of system 10. Controller 28 may include one or more general- or special-purpose processors or microprocessors. Controller 28 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 28, including power supply circuitry, signal-conditioning circuitry, solenoid/motor driver circuitry, communication circuitry, and other appropriate circuitry. Moreover, controller 28 may be capable of communicating with other components of system 10 via wired and/or wireless transmission.

One or more maps may be stored in the memory of controller 28 and used during fabrication of structure 12. Each of these maps may include a collection of data in the form of models, lookup tables, graphs, and/or equations. In the disclosed embodiment, the maps are used by controller 28 to determine desired characteristics of cure enhancers 26, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 28 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 26, such that structure 12 is produced in a desired manner.

In some applications, it may be beneficial to selectively sever the continuous reinforcement extending from outlet 18, without negatively affecting a movement and/or fabrication ability of print head 16. A cutting mechanism 30 may be provided for this purpose. In the disclosed embodiment, cutting mechanism 30 is mounted directly to head 16. It is contemplated, however, that cutting mechanism 30 could alternatively be mounted to support 14 and/or to a different support that is separate from support 14 (e.g., mounted to another robotic arm). Cutting mechanism 30 is disclosed in the '054 application and will not be discussed in great detail in this disclosure. It should be noted that any type of fiber-cutting mechanism may be utilized in conjunction with head 16 and system 10.

As shown in FIG. 1, cutting mechanism 30 may include, among other things, a cutting implement (e.g., shears) 32 and a motorized linkage arrangement ("arrangement") 34 that moves and actively opens-and-closes cutting implement 32 to selectively grasp and/or sever the continuous reinforcement. It is contemplated, however, that cutting implement 32 could be only actively closed and passively opened (e.g., via a spring—not shown), if desired. It is also contemplated that cutting implement 32 could be double-acting, wherein each opening and each closing would affect severing of the continuous reinforcement. Arrangement 34 may operatively mount cutting implement 32 to a side (e.g., a trialing side) of head 16 and be selectively energized (e.g., by controller 28) to cause cutting implement 32 to open-and-close and also to move from a stowed position (shown in FIG. 1) to any number of deployed positions (shown in FIGS. 2-5).

Figure 2:
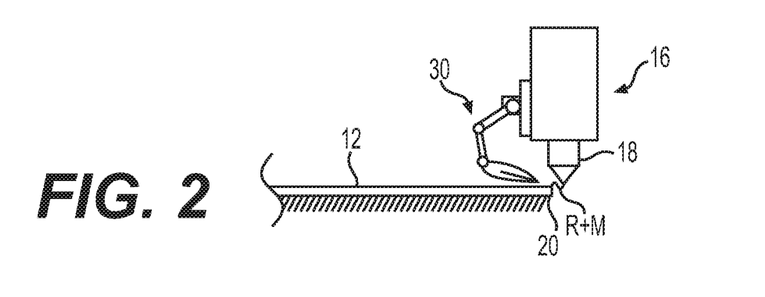
FIGS. 2, 3, 4, and 5 are diagrammatic illustrations of an exemplary severing method that may be performed by the additive manufacturing system of FIG. 1.
Figure 3:
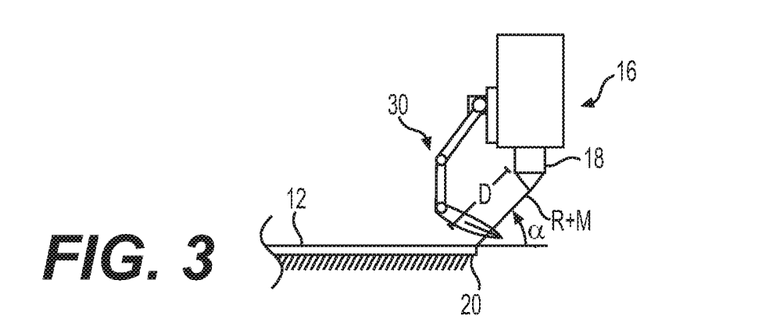

It has been determined that, at conclusion of a material-discharging pass and/or at conclusion of another fabrication event, an offset distance between the tip end of outlet 18 and the discharged material of structure 12 may be too small for cutting mechanism 30 (i.e., for cutting implement 32 of cutting mechanism 30) to intrude and sever the discharging material (see FIG. 2). Accordingly, head 16 may need to move away from structure 12 a distance D that allows intrusion of cutting mechanism 30. However, this movement may result in additional material being discharged (e.g., pulled) from outlet 18. If unaccounted for, subsequent severing by cutting mechanism 30 may either leave an extra and unwanted tail of material clinging to structure 12 (if cutting mechanism 30 were to cut adjacent to the tip of outlet 18), or an extra and unwanted tail clinging to outlet 18 that would end up connected to the next structure 12 fabricated by head 16 (if cutting mechanism 30 were to cut adjacent to structure 12). The method of FIGS. 2-5 provides a way to sever the discharging material without leaving an undesired tail clinging to structure 12 or outlet 18.

The method of FIGS. 2-5 may be initiated at conclusion of a fabrication event (e.g., at termination of a material-discharging pass). Thereafter, head 16 may be moved by support 14 under the regulation of controller 28 the distance D away from structure 12. This distance D may provide sufficient clearance between head 16 and structure 12 for cutting mechanism 30 to sever the composite material at a surface boundary of structure 12 (shown in FIG. 3). In some embodiments, a purely z-direction movement (e.g., a movement that is generally orthogonal to an axis of the reinforcement being discharged from outlet 18) away from structure 12 may cause the reinforcement to be pulled away from a desired trajectory (e.g., to become untacked from the rest of structure 12). Accordingly, at the end of a print path (regardless of whether severing is to occur), head 16 may be moved by support 14 through the distance D along a desired exit tack angle α that helps to maintain the tacked reinforcement in a desired location. Tack angle α may be oblique relative to the axis of the tacked portion of the reinforcement. In one embodiment, the angle α is about 3-60 degrees. A shallower angle could result in collision of outlet 18 with structure 12, while a steeper angle increases the risk of undesired reinforcement untacking.

Figure 4:
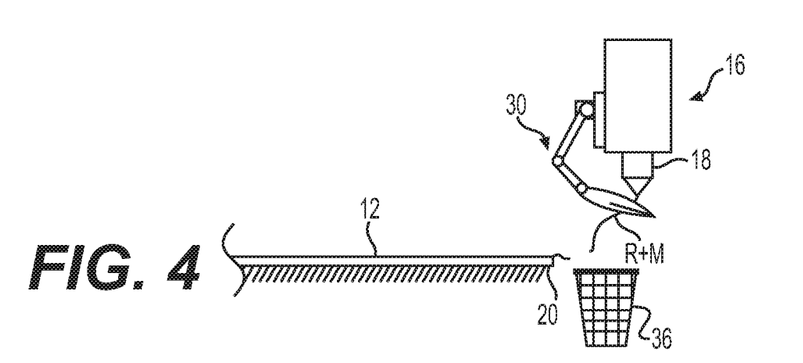
Figure 5:
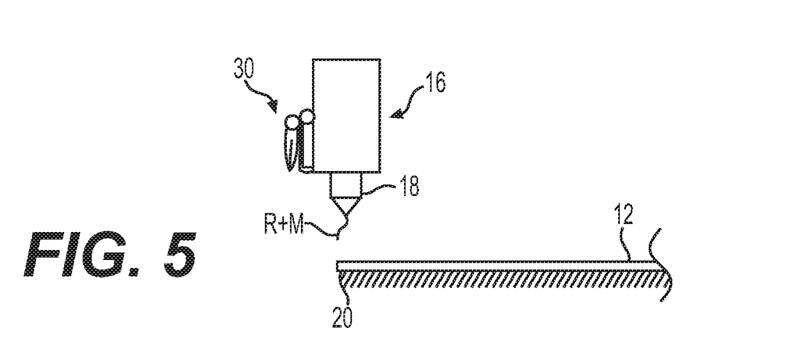

Cutting mechanism 30 may then be moved to again sever the composite material at a location adjacent the tip end of outlet 18 (shown in FIG. 4). In some embodiments, this location may be at a surface boundary of outlet 18. In other embodiments, this location may be offset a distance from the surface boundary, such that a short tail of material having a length sufficient for anchoring at the start of a new discharging pass may be left protruding from outlet 18 (See FIG. 5). This length of anchor material may be adjustable, depending on the needs of a particular application and/or tool path sequence.

It is contemplated that, prior to and/or during the second severing step described above, controller 28 may cause head 16 to move to a waste discard location. In this manner, completion of the second severing step may result in the unwanted material falling into an appropriate collection receptacle 36 (see FIG. 4). After completion of the second severing step, cutting mechanism 30 may be moved back to the stowed position.

In some embodiments, cutting implement 32 may have serrated edges on associated blades. In these embodiments, cutting implement 32 should be held relatively stationary during severing (e.g., during pivoting of the blades towards each other from opposing sides of the discharging composite material), such that the serrations grab and cut individual fibers of the associated reinforcement during blade pivoting. However, in other embodiments, cutting implement 32 may have straight edges (i.e., no serrations) or any existing serrations may be much larger than the diameters of the associated fibers. In these embodiments, it has been found that a sliding motion of the pivoting blades away from the fibers being cut (e.g., in a radial direction relative to axes of the fibers) can be beneficial. For example, the likelihood of pinching or folding the fibers may be reduced during the sliding motion, as the sliding motion induces more of a slicing effect instead of only a pinching effect. It is contemplated that this sliding motion could be combined with blades having serrated or otherwise non-straight blades, if desired.

Figure 6:
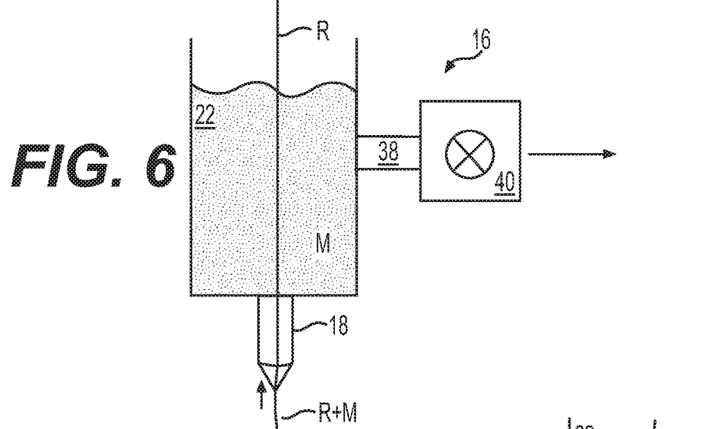
FIGS. 6, 7, and 8 are cross-sectional illustrations of an exemplary print head and fiber management arrangement that may be utilized with the additive manufacturing system of FIG. 1.
Figure 7:
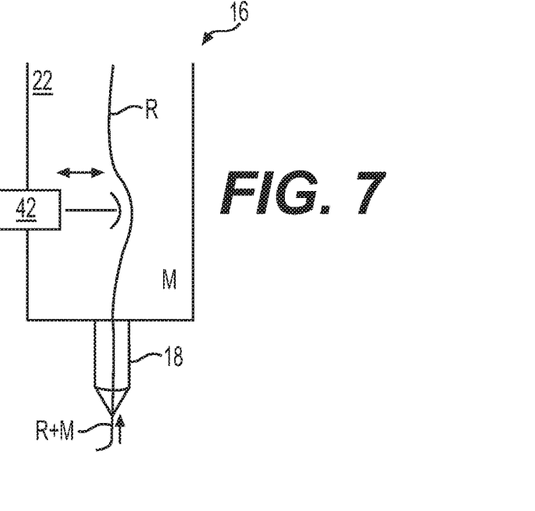
Figure 8:
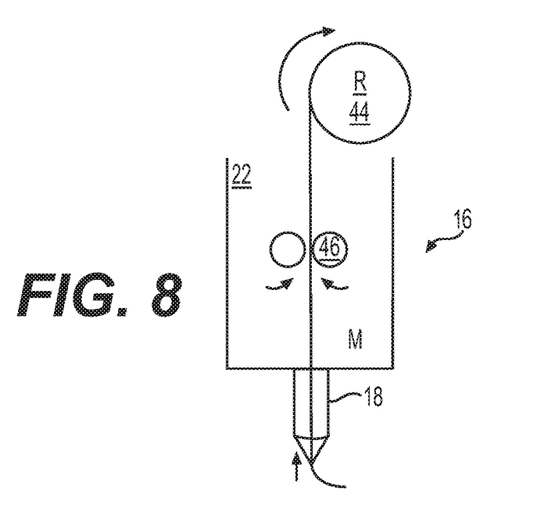

FIGS. 6, 7, and 8 illustrate various fiber management arrangements for accommodating an undesired tail of composite material left protruding from outlet 18 of print head 16 after severing. In particular, it has been found that, during some fabrication events, a long tail or any tail at all is undesirable. And, in some applications, it may not be possible for cutting mechanism 30 to cut away all protruding material. Accordingly, in these applications, it may be beneficial or even necessary to draw some or any tail that remains after severing back into outlet 18. This may be done in several different ways, which are illustrated in FIGS. 6-8.

As shown in FIG. 6, one way to retract a tail of composite material back into print head 16 may be to create a vacuum or at least a reverse matrix flow within matrix reservoir 22. For example, matrix could be removed from an end of reservoir 22 upstream of outlet 18. This may be accomplished by connecting a low-pressure line 38 to reservoir 22 and/or opening a valve 40 to an existing low-pressure line 38. The low pressure may function to pull matrix away from and/or out of outlet 18, and this flow of matrix may cause any associated reinforcement to be drawn with it. Once some or all of the reinforcement is back inside of outlet 18, connection with low-pressure line 38 may be discontinued.

As shown in FIG. 7, another way to retract the tail back into print head 16 may be to adjust a path of the associated reinforcement within outlet 18 and/or matrix reservoir 22. In particular, the normal path of the reinforcement may generally lie along a straight-line axis of head 16. As the reinforcement is moved away from the normal path inside of head 16, without allowing any more reinforcement to enter head 16, deviation may cause the tail to be pulled back through outlet 18. In the depicted example, a plunger (e.g., an electrically, pneumatically, or hydraulically driven piston) 42 may be selectively activated to push a middle portion of the reinforcement away from the straight-line axis or normal fiber path of head 16. The extension distance of plunger 42 may be selected to accommodate some or all of the length of tail normally left protruding from outlet 18 after being cut by cutting mechanism 30.

A final way to retract the tail back into print head 16 is illustrated in FIG. 8. As can be seen in this example, the reinforcement may be supplied into head 16 from a spool 44 and forced into outlet 18 via one or more drive rollers 46. To retract the discharged composite material back into outlet 18, one or more actuators (not shown) associated spool 44 and/or drive rollers 46 may be reversed to pull some or all of the reinforcement back through outlet 18. In some embodiments, the reinforcement may be pulled back into reservoir 22. In other embodiments, the reinforcement may be wound back onto spool 44.

INDUSTRIAL APPLICABILITY

The disclosed system may be used to continuously manufacture composite structures having any desired cross-sectional size, shape, length, density, and/or strength. The composite structures may be fabricated from any number of different reinforcements of the same or different types, diameters, shapes, configurations, and consists, each coated with a variety of matrixes. In addition, the disclosed cutting methods and fiber management arrangements may allow for optimal termination of a current manufacturing event and/or restart of a subsequent event. Operation of system 10 will now be described in detail.

At a start of a manufacturing event, information regarding a desired structure 12 may be loaded into system 10 (e.g., into controller 28 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, primary load paths, support requirements, cutting requirements, anchoring requirements, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of the reinforcements may be performed by passing reinforcements from internal and/or external spools down through matrix reservoir 22, and then threading the reinforcements through outlet 18. Installation of the structural matrix may include filling reservoir 22 within head 16 and/or coupling of one matrix sources to head 16. Head 16 may then be moved by support 14 under the regulation of controller 28 to cause matrix-coated reinforcements (i.e., continuous reinforcements that are coated in the structural matrix) to be placed against or on a corresponding stationary anchor point 20. Cure enhancers 26 within head 16 may then be selectively activated to cause hardening of the structural matrix surrounding the continuous reinforcements, thereby bonding ends of the continuous reinforcements to anchor point 20.

The component information may then be used to control operation of system 10. For example, the continuous reinforcements may be pulled and/or pushed from outlet 18 (along with the structural matrix), while support 14 selectively moves head 16 in a desired manner during curing, such that an axis of the resulting structure 12 follows a desired trajectory (e.g., a free-space, unsupported, supported, and/or 3-D trajectory).

Once structure 12 has grown to a desired size and/or length, structure 12 may be disconnected (e.g., severed) from head 16 in any desired manner. Severing of the continuous fiber extending from head 16 may be accomplished via cutting mechanism 30. For example, when controller 28 determines that severing of the continuous fiber may be beneficial, controller 28 may cause support 14 to move head 16 away from structure 12 the distance D (referring to FIG. 3), which provides clearance for cutting implement 32. This movement may also cause the continuous reinforcement to be pulled taut, which may aid in the severing process.

At this point in time, cutting implement 32 may be opened, moved from the stowed position into a deployed position straddling the reinforcement, and then closed to sever the reinforcement. It is contemplated that, in some embodiments (e.g., in embodiments where cutting implement 32 is not serrated), the closing motion of cutting implement 32 may be implemented at about the same time as a movement back toward the stowed position and/or during tilt angle adjustment. For example, while cutting implement 32 is closing on the continuous reinforcement, cutting implement 32 may be pulled radially away from the continuous reinforcement, such that cutting implement 32 slides along the reinforcement in a slicing motion. This may help to reduce bunching of the reinforcement during cutting.

As described above, a second cutting operation may be performed by mechanism 30 on the reinforcement at a location closer to outlet 18, if desired. This second cutting operation may function to reduce or remove any remaining tail, and may be accomplished after movement to an appropriate discard location.

At some point after severing of the reinforcement from structure 12 is complete, some or all of any remaining tail of reinforcement may be pulled back into head 16, in particular applications. This may be accomplished via any of the arrangements illustrated in FIGS. 6-8.

The disclosed methods and arrangements may allow for clean, efficient, and secure termination of a current fabrication event, with low risk of untacking. In addition, the disclosed methods and arrangements may help prepare head 16 for initiation of a next fabrication event.

It will be apparent to those skilled in the art that various modifications and variations can be made to the disclosed system and cutting mechanism. Other embodiments will be apparent to those skilled in the art from consideration of the specification and practice of the disclosed system and cutting mechanism. It is intended that the specification and examples be considered as exemplary only, with a true scope being indicated by the following claims and their equivalents.

What is claimed is:

1. A method of severing a continuous reinforcement from a print head at conclusion of an event during fabrication of a composite structure, the method comprising:
   moving an outlet of the print head away from the composite structure to provide clearance for a cutting mechanism between the outlet of the print head and the composite structure;
   responsively causing the cutting mechanism to make a first cut of the continuous reinforcement at a first distance away from the outlet of the print head;
   moving the print head to a waste discard location; and
   responsively causing the cutting mechanism to make a second cut of the continuous reinforcement at a second distance away from the outlet of the print head, the second distance being different from the first distance.

2. The method of claim 1, wherein moving the outlet of the print head a distance away from the composite structure includes moving the outlet of the print head along a trajectory that is at an oblique angle relative to an axis of the continuous reinforcement in the composite structure.

3. The method of claim 2, wherein the oblique angle is about 3-60°.

4. The method of claim 1, wherein causing the cutting mechanism to make the first cut includes causing the cutting mechanism to make the first cut simultaneously with moving the cutting mechanism away from the continuous reinforcement.

5. The method of claim 1, wherein moving the outlet of the print head the distance away from the composite structure causes the continuous reinforcement to be pulled out of the print head.

6. The method of claim 1, wherein:
   responsively causing the cutting mechanism to make the second cut of the continuous reinforcement leaves a tail of the continuous reinforcement extending out of the print head; and
   the method further includes retracting the tail into the print head after the second cut is made.

7. The method of claim 6, wherein retracting the tail into the print head includes creating a low-pressure inside the print head that draws the tail into the print head.

8. The method of claim 7, wherein creating the low-pressure inside the print head includes drawing matrix out of the print head.

9. The method of claim 6, wherein retracting the tail into the print head includes forcing the continuous reinforcement to deviate from a straight-line path through the print head.

10. The method of claim 9, wherein forcing the continuous reinforcement to deviate from the straight-line path includes pushing a middle portion of the continuous reinforcement inside the print head with a plunger away from the straight-line path.

11. The method of claim 6, wherein retracting the tail into the print head includes pulling the continuous reinforcement back into the print head with at least one of a drive roller and a spool.

12. A method of severing a continuous reinforcement from a print head at conclusion of an event during fabrication of a composite structure, the method comprising:
    moving an outlet of the print head a distance away from the composite structure to provide a clearance between the outlet and the composite structure;
    moving a cutting mechanism through the clearance toward the continuous reinforcement;
    and causing the cutting mechanism to sever the continuous reinforcement at a distance away from the outlet of the print head to leave a tail of the continuous reinforcement extending out of the outlet.

13. The method of claim 12, wherein the cutting mechanism is mounted to the print head and moving the cutting mechanism through the clearance includes moving the cutting mechanism relative to the print head.

14. The method of claim 13, further including maintaining the print head stationary during the moving of the cutting mechanism through the clearance.

15. The method of claim 12, further including pulling taut a portion of the continuous reinforcement extending from the print head to the composite structure prior to moving the cutting mechanism through the clearance.

16. The method of claim 12, wherein moving the outlet away from the composite structure includes moving the outlet along a trajectory that is oriented at an oblique angle relative to an axis of the continuous reinforcement in the composite structure.

17. The method of claim 12, further including moving the outlet back toward the composite structure to anchor the tail of the continuous reinforcement.

18. The method of claim 17, further including exposing the tail to UV light to anchor the tail.

19. The method of claim 12, wherein:
    the event is a discharging event and;
    prior to moving of the outlet away from the composite structure at the conclusion of the event, a distance between the outlet and the composite structure is less than a dimension of the cutting mechanism.

* * * * *